United States Patent
Sarreo et al.

(10) Patent No.: US 10,230,855 B1
(45) Date of Patent: Mar. 12, 2019

(54) ASYNCHRONOUS USAGE OF REDIRECTED SCANNERS WITH A SINGLE DRIVER

(71) Applicant: Parallels International GmbH, Schaffhausen (CH)

(72) Inventors: Matthew Cini Sarreo, San Gwann (MT); Paul Gafa, Sliema (MT); Nikolay N. Dobrovolskiy, Moscow (RU); Serguei M. Beloussov, Singapore (SG)

(73) Assignee: Parallels International GmbH, Schaffhausen (CH)

( * ) Notice: Subject to any disclaimer, the term of this patent is extended or adjusted under 35 U.S.C. 154(b) by 0 days.

(21) Appl. No.: 15/263,093

(22) Filed: Sep. 12, 2016

(51) Int. Cl.
*H04N 1/00* (2006.01)
*H04N 1/04* (2006.01)
*H04N 1/32* (2006.01)

(52) U.S. Cl.
CPC ..... *H04N 1/00344* (2013.01); *H04N 1/00962* (2013.01); *H04N 1/0464* (2013.01); *H04N 1/32507* (2013.01); *H04N 2201/0039* (2013.01); *H04N 2201/0081* (2013.01)

(58) Field of Classification Search
CPC .................. H04N 1/00962; H04N 1/00344
See application file for complete search history.

(56) References Cited

U.S. PATENT DOCUMENTS

| | | | | |
|---|---|---|---|---|
| 5,655,148 A | * | 8/1997 | Richman | G06F 9/4411 710/11 |
| 5,768,566 A | * | 6/1998 | Harikrishnan | G06F 8/62 717/170 |
| 5,911,044 A | * | 6/1999 | Lo | H04N 1/00236 709/203 |
| 7,012,706 B1 | * | 3/2006 | Hansen | H04N 1/00241 358/1.13 |
| 2004/0154015 A1 | * | 8/2004 | Hirai | G06F 8/60 717/174 |
| 2006/0132838 A1 | * | 6/2006 | Bechtel | H04N 1/00204 358/1.15 |

* cited by examiner

*Primary Examiner* — Ibrahim Siddo
(74) *Attorney, Agent, or Firm* — Lowenstein Sandler LLP

(57) ABSTRACT

A processing device in a server computer system generates multiple instances of a universal scanner driver on a server, each instance corresponding to a different scanner connected at separate user devices. The processing device receives requests for an application running on the server to scan documents using the multiple scanners concurrently. The processing device sends, using the different instances of the universal scanner driver, the requests to each user device concurrently and receives scan data corresponding to the documents from the user device.

20 Claims, 6 Drawing Sheets

ASYNCHRONOUS USAGE OF REDIRECTED SCANNERS WITH A SINGLE DRIVER

TECHNICAL FIELD

Embodiments of this disclosure relate generally to redirected scanners and, more specifically, relate to asynchronous usage of redirected scanners with a single driver.

BACKGROUND

An image scanner is a device that optically scans images, printed text, handwriting, or an object, and converts it to a digital image. The digital image can be provided to a computing device for storage and/or further processing.

BRIEF DESCRIPTION OF THE DRAWINGS

Embodiments of the present disclosure will be understood more fully from the detailed description given below and from the accompanying drawings, which, however, should not be taken to limit the present disclosure to the specific embodiments, but are for explanation and understanding only.

DETAILED DESCRIPTION

Figure 1:
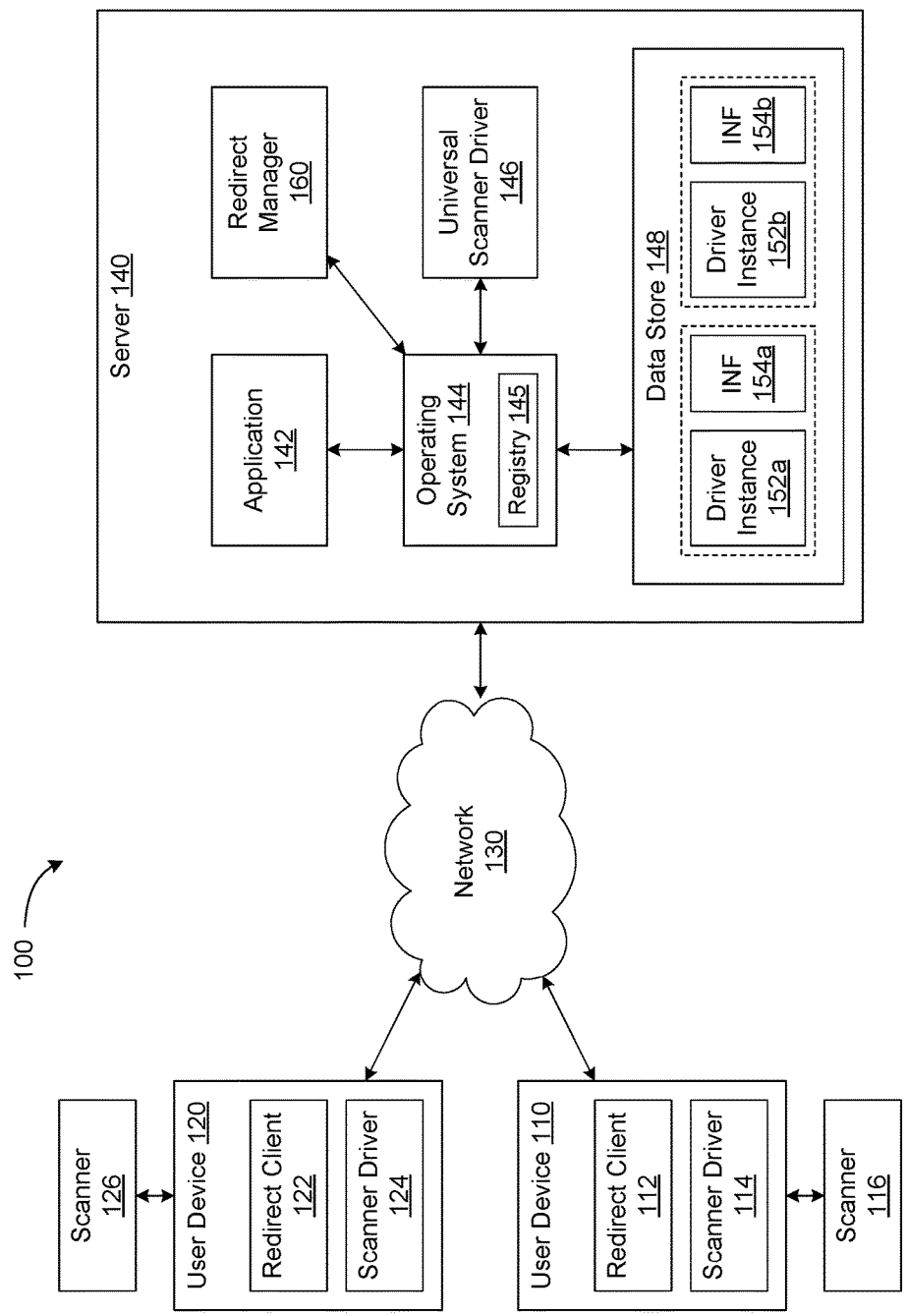
FIG. 1 is a block diagram illustrating a networked environment in which embodiments of the present disclosure may be implemented.

An image scanner is a device that optically scans images, printed text, handwriting, or an object, and converts it to a digital image. The digital image can be provided to a computing device for storage and/or further processing. In certain situations, a user, through their own local client computer, may access an application. remote server computer system (e.g., in a remote or virtual desktop) over a network. If the user has a peripheral device, such as an image scanner, connected to their local client computer, the application on the server may not be able to access the scanner. Redirecting the scanner that is connected to the user's local client computer or other user device allows the user to operate the scanner as a virtual device to perform scanning operations in the remote desktop or with the application running on the server computer system. As a result of redirecting the scanner, the scanner appears to the application to be locally connected at the server, and the application can access the scanner to perform associated operations (e.g., image capture).

Conventional scanner redirection solutions suffer from drawbacks that limit performance and degrade the user experience. For example, certain systems function by installing a copy of the scanner specific driver on the server before the application running on the server can scan a document for a remote user via the scanner on the local machine of the remote user. This scanner specific driver is provided by the scanner manufacturer and is manually installed on the server. Thus, if multiple users (or a single user) wish to use a number of different scanners in connection with the application running on the server, there is typically a different scanner driver installed on the server for each of the number of different scanners. Other systems install only one scanner driver, but the scanner driver can only redirect one remote scanner at a time. Thus, in order for different users (or a single user) to scan from different scanners, they usually have to wait until the single copy of the scanner driver is available. For example, if a first user is currently scanning a document using a first scanner through the application running on the server, a second user is typically not even able to scan a different document using their own second scanner through the application running on the server until the first user's scanning process is complete. In either case, these drivers are usually used in a synchronous manner, such that once an application is scanning documents from a particular scanner, using the corresponding scanner specific driver, the same or another application cannot scan (using the same driver) until the first application is finished.

Embodiments are described herein for asynchronous usage of redirected scanners with a single driver to avoid the limitations described above. In one embodiment, a redirect manager on the server allows applications to use the same universal scanner driver for any number of scanners that are installed on corresponding user devices of remote users. As a result, each scanner can function independently, allowing multiple different redirected scanners to be used concurrently by the server. The redirect manager generates and installs a new instance of the universal scanner driver for each separate scanner, which can be used with a unique setup information file, such as an INF file, to perform scanning operations using a corresponding remote scanner. Each instance of the universal scanner driver redirects scanning requests to the corresponding client device where the physical scanner is connected for processing by a scanner specific driver installed on that client device. The redirect manager then receives scan data corresponding to the scanned document from the client device and provides the scan data to the application in use. As a result, the overall scanning process and operation of the server computer system are greatly improved. A system administrator no longer has to manually install a different scanner driver corresponding to each separate scanner on the server. The process of generating an instance of the universal scanner driver for a newly installed scanner is completely automated by the redirect manager. In addition, not having a unique scanner driver on the server computer system for each different scanner can save storage space on the server computer system, allowing those resources to be utilized in some other fashion. Furthermore, rather than performing synchronous scanning where only one scanner can be utilized in connection with the server at a time, asynchronous scanning can now be performed where multiple different remote scanners are used concurrently by the application running on the server. Thus, one user need not wait to use his or her own locally connected scanner until some other user has completed scanning using a completely different scanner. Additional details of the asynchronous scanning process are described herein below.

FIG. 1 is a block diagram illustrating a networked environment 100 in which embodiments of the present disclosure may be implemented. The networked environment 100 includes user devices 110 and 120 and one or more servers 140, which are in data communication with each other via network 130. Computer system 600 illustrated in FIG. 6 may be one example of any of user device 110 and 120 or server 140. The network 130 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

Server 140 may include, for example, a server computer or any other system providing computing capability. Alternatively, server 140 may employ a plurality of computing devices that may be arranged, for example, in one or more server banks or computer banks or other arrangements. Such computing devices may be positioned in a single location or may be distributed among many different geographical locations. For example, server 140 may include a plurality of computing devices that together may comprise a hosted computing resource, a grid computing resource and/or any other distributed computing arrangement. In some cases, server 140 may correspond to an elastic computing resource where the allotted capacity of processing, network, storage, or other computing-related resources may vary over time.

Various applications 142 and/or other functionality may be executed by server 140 according to various implementations. Also, various data may be stored in a data store 148 that is accessible to server 140. The data stored in the data store 148, for example, is associated with the operation of the various applications 142 and/or functional entities described below.

The components executed on server 140 can include, for example, an operating system 144, one or more applications 142, a universal scanner driver 146 and redirect manager 160. Operating system 144 may include a set of programs that manage hardware resources of server 140 and provide common services for applications, such as application 142 running on server 140. In one embodiment, operating system 144 may include a kernel to control low-level processes, such as how memory is read and written, the order in which processes are executed, how information is received and sent by server 140, to control any peripheral devices, such as monitor, keyboard, mouse, touch screen, scanner, etc. and how to interpret information received over networks, such as network 130. Operating system 144 may additionally include a user interface to interact with a user of server 140 or of any virtual machines or virtual resources provided by server 140, allowing the user to control and use application 142, for example. In addition, operating system 144 may include application programming interfaces (APIs) to provide services and code libraries that let application developers write modular code reusing defined programming sequences in user space libraries or in the operating system 144 itself. In one embodiment, the operating system 144 may be the Windows™ operating system from Microsoft. In other embodiments, operating system 144 may be some other operating system that provides similar functionality. In one embodiment, the operating system 144 includes registry 145 to store information about server 140 and applications 142, such as for example, permission entries defining access to installed or redirected hardware devices (e.g., scanners 116 and 126).

In one embodiment, operating system 144 includes a scanning platform to receive and process image scanning requests on behalf of applications, such as application 142, running on top of operating system 144. In one embodiment, the platform includes Windows Imaging Acquisition (WIA) from Microsoft. In another embodiment, the platform includes TWAIN. The platform enables graphics software, such as application 142, to communicate with imaging hardware, such as redirected scanners 116 and 126, digital cameras, digital video equipment, or other hardware.

Application 142 may be a software program that causes server 140 to perform useful tasks beyond the running of the server itself. For example, application 142 may be a content access application, such as a media player, an entertainment application, such as a video game, a general productivity and information retrieval application, such as a web browser, email, calendar, contacts, word processing application or spreadsheet application, a social networking application, an image processing application, or other types of applications. In one embodiment, application 142 accepts scan data corresponding to a digital scan of a document (e.g., as performed by one of scanners 116 or 126) as input and provides the ability to store, process, manipulate, etc. the received scan data.

In one embodiment, redirect manager 160 controls asynchronous scanning operations using redirected scanners on server 140. Redirect manager 160 may generate multiple instances 152a, 152b of a universal scanner driver 146, where each instance corresponds to a different scanner connected at separate user devices. For example, driver instance 152a may correspond to scanner 116 and driver instance 152b may correspond to scanner 126. In one embodiment, redirect manager 160 creates an instance 152a, 152b of the driver 146 each time the driver is opened and destroys the instance when the driver is closed. These driver instances 152a, 152b may be useful for installable drivers that support multiple devices (e.g., multiple scanners) or that are opened by multiple applications or by the same application multiple times. In one embodiment, the driver instances 152a, 152b include individual processes or sets of processes that can run in parallel under the control of operating system 144 or redirect manager 160. Universal scanner driver 146 may be designed to work with any scanner that is redirected to server 140. In one embodiment, universal scanner driver 146 is not scanner-specific and is not provided by the manufacturer of any redirected scanner but rather may be installed on server 140 by an administrator without regard to any particular scanner. In one embodiment, the administrator many manually install universal scanner driver 146 on server 140. In another embodiment, redirect manager 160 may automatically install universal scanner driver 146 on server 140. As operating system 144 receives requests from application 142 to scan documents using remote scanners 116 and 126 concurrently, operating system 144 calls the separate instances 152a, 152b and redirect manager 160 sends the requests to each user device 110 and 120 concurrently. In one embodiment, each driver instance 152a, 152b is customized for the corresponding scanner 116 or 126 by a unique setup information file 154a, 154b.

In one embodiment, each user or client device 110, 110 may have or use a corresponding container on server 140. These containers may be light weight containers for isolation of dedicated software or to serve as a kind of Docker container. Creating a container may include the creation of a set of files and starting a set of processes. In one embodiment, each container has unique identifier (ID) and processes gathered in container have individual IDs corresponding to the container ID. As a result, processes from different containers may be invisible to each other. In one embodiment, redirect clients 112 and 122 and driver instances 152a, 152b may be isolated in dedicated containers associated with the corresponding user devices 110, 120 to unload redirect client associated services. In another embodiment, container replication techniques may be used to create new driver instances. For example, when a container is replicated, a new instance of the universal scanner driver 146 may be created as a replica of the driver instance in the replicated container. In another embodiment, specific drivers are described as required containers for execution and these containers are started or created when such a driver is requested. After the container is created, the corresponding driver instance may be started inside the container.

In one embodiment, unique setup information files 154a, 154b are INF files generated by redirect manager 160 using scanner configuration details received from user devices 110 and 120. The scanner configuration details may include, for example, supported paper sizes, speeds, resolutions, colors, etc. of corresponding scanners 116 and 126. These scanner configuration details are included in the INF files to enable communication with scanner drivers 114 and 124. After scanning is completed by scanners 116 and 126, redirect manager 160 may receive scan data corresponding to the scanned documents from user devices 110 and 120.

In one embodiment, server 140 further includes data store 148 which may store driver instances 152a, 152b, INF files 154a, 154b and/or other server data. Data store 148 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

User devices 110 and 120 are representative of a plurality of client devices that may be coupled to the network 130. User devices 110 and 120 comprise, for example, processor-based systems such as computer systems. Such computer systems may be embodied in the form of desktop computers, laptop computers, personal digital assistants, cellular telephones, smartphones, set-top boxes, music players, web pads, tablet computer systems, game consoles, electronic book readers, or other devices with similar capability. In one embodiment, user device 110 includes redirect client 112 and user device 120 includes redirect client 122. Redirect clients 112 and 122 may receive scan requests from redirect manager 160 or a corresponding instance 152a, 152b of universal scanner driver 146 on server 140 and may direct the requests to the corresponding scanner drivers 114 and 124 on user devices 110 and 120.

In one embodiment, scanner 116 is connected to user device 110 and scanner 126 is connected to user device 120. Each of scanners 116 and 126 may be an image scanner that optically scans images, printed text, handwriting, or objects, and converts them to a digital image. Scanners 116 and 126 may use charge-coupled devices (CCDs), contact image sensors (CISs), photomultiplier tubes (PMTs), or other image sensors to capture the digital image. Depending on the embodiment, scanners 116 and 126 may be representative of drum scanners, flatbed scanners, film scanners, roller scanners, three-dimensional (3D) scanners, planetary scanners, digital cameras, or other image capture devices. Regardless of the technology used, scanners 116 and 126 provide the ability to capture a digital image, representation or reproduction of a document or other object, as a means of user input for user devices 110 and 120.

In one embodiment, user device 110 includes scanner driver 114 and user device 120 includes scanner driver 124, which are used to control the operation of scanners 116 and 126, respectively. Scanner drivers 114 and 124 control what is scanned by scanners 116 and 126 and process the scan data received through scanners 116 and 126. Scanner drivers 114 and 124 may be device specific drivers provided by the corresponding manufacturers of scanners 116 and 126. Scanner drivers 114 and 124 enable operating systems of user devices 110 and 120 and other computer programs to access hardware functions of scanners 116 and 126 and may communicate with scanners 116 and 126 over a system bus or other communications subsystem to which the scanners 116 and 126 are connected. When a calling application invokes a routine in the driver 114 or 124 (e.g., a scanning routine), the driver 114 or 124 issues corresponding commands to the scanner 116 or 126. Once the scanner 116 or 126 sends scan data back to the driver 114 or 124, the driver 114 or 124 may invoke routines in the original calling program.

Figure 2:
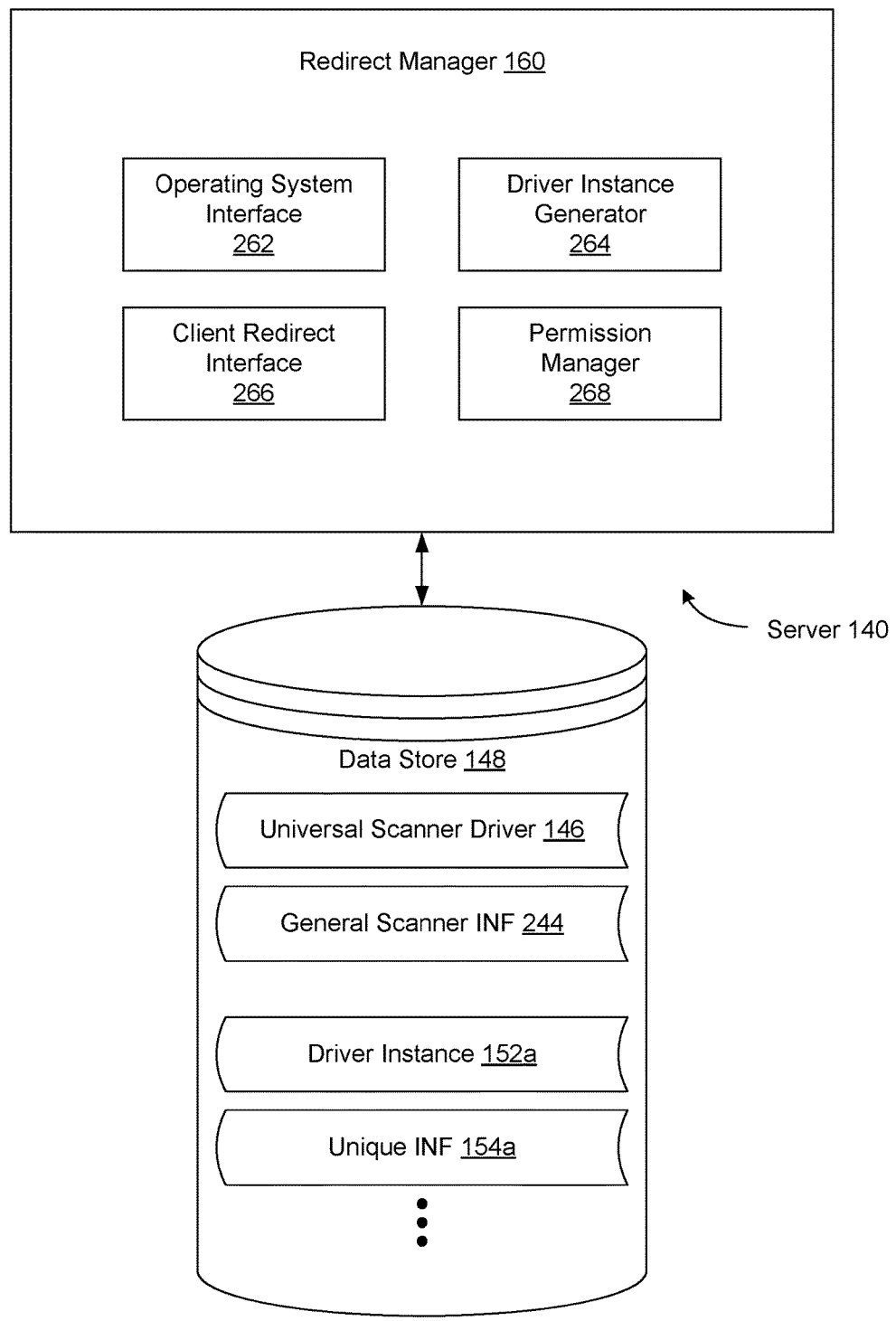
FIG. 2 is a block diagram illustrating a scanner redirect manager, according to an embodiment.

FIG. 2 is a block diagram illustrating a scanner redirect manager 160, according to an embodiment. In one embodiment, scanner redirect manager 160 includes operating system interface 262, driver instance generator 264, client redirect interface 266, and permission manager 268. This arrangement of modules and components may be a logical separation, and in other embodiments, these modules or other components can be combined together or separated in further components. In one embodiment, data store 148 is connected to redirect manager 160 and includes universal scanner driver 146, general scanner INF file 244, and a plurality of instances 152a, etc. of the universal scanner driver 146 and a plurality of unique INF files 154a, etc. In one embodiment, server 140 may include both redirect manager 160 and data store 148. In another embodiment, data store 148 may be external to server 140 and may be connected to server 140 over a network or other connection. In other embodiments, redirect manager 160 may include different and/or additional components which are not shown to simplify the description.

In one embodiment, operating system interface 262 is responsible for communication and interaction with operating system 144 on server 140. For example, operating system 144 may receive requests from application 142 to scan one or more documents using at least one of scanners 116 and 126. Operating system 144 can notify redirect manager 160 of the received requests. In another embodiment, operating system interface 262 can detect the presence of a new scanner 116 or 126 associated with one of user devices 110 or 120. During a driver installation process, operating system interface 262 can request installation of a new instance 152a of universal scanner driver 146 for the newly detected scanner 116. In another embodiment, operating system interface 262 can detect the launch of application 142 by a user of server 140. Operating system interface 262 can further receive a request to scan a document using one of scanner 116 or 126 and can send the request to a scanning process of operating system 144, which in turn calls the corresponding instance 152a of universal scanner driver 146.

In one embodiment, driver instance generator 264 generates each instance 152a, 152b of universal scanner driver 146 and each corresponding unique setup information file (INF file) 154a, 154b. In one embodiment, there is one instance of universal scanner driver 146 and one unique setup information file for each scanner utilized with server 140. Driver instance generator 264 may generate the unique setup information file based on scanner configuration details provided by user device 110 or 120. The unique INF file 154a contains various sections that specify certain operations to be performed and data values to be stored in order to customize the driver instance 152a for use with the corresponding scanner 116 and its associated scanner-specific driver 114. In one embodiment, driver instance generator 264 assigns each instance of the universal scanner driver and the INF file a unique name and a unique identifier to be used in communications between the server 140 and the user devices 110 and 120. Using a different INF file with a unique name causes operating system 144 to create a new instance of the class exported by the universal scanner driver 146 for each instance of the scanner driver. The scanner driver instance may have a name that matches that of the unique INF file.

In one embodiment, client redirect interface 266 is responsible for communication and interaction with client devices, such as user device 110 and 120. In one embodiment, client redirect interface 266 establishes a pipe with the instance of the driver 152a for a particular scanner 116 so that the instance of the driver 152a can communicate with the remote user's session. The instance of the driver 152a reads a registry key from registry 145 and whenever communication is to be done with the remote scanner 116, a unique identifier bound to the target scanner name is used by the communication protocol. This allows for selecting the correct remote scanner in cases where a single user has multiple scanners installed and available for use.

In one embodiment, permission manager 268 is responsible for setting and verifying access permissions in operating system registry 145 of operating system 144 on server 140. Since a new class is exported, each scanner is seen to be a unique device using a different driver, thereby causing all driver locks to be unique to that particular instance of the driver. As a result, other devices are not locked out due to locks set by a particular driver instance. Each scanner now has its own registry entries in registry 145 and has locks that are not shared with any other device, (not even other scanners using the same driver). Permission manager 268 can read the registry entries to determine whether a particular user is authorized to access a particular scanner and can instruct application 142 to provide a list of authorized scanners to the user for selection. In one embodiment, in order to verify permissions using the operating system registry 145, permission manager 268 may modify a scanning API behavior of operating system 144 by adding permissions checks (i.e., within the logic of the API itself) based on data added to operating system registry 145 during installation by redirect manager 160.

Figure 3:
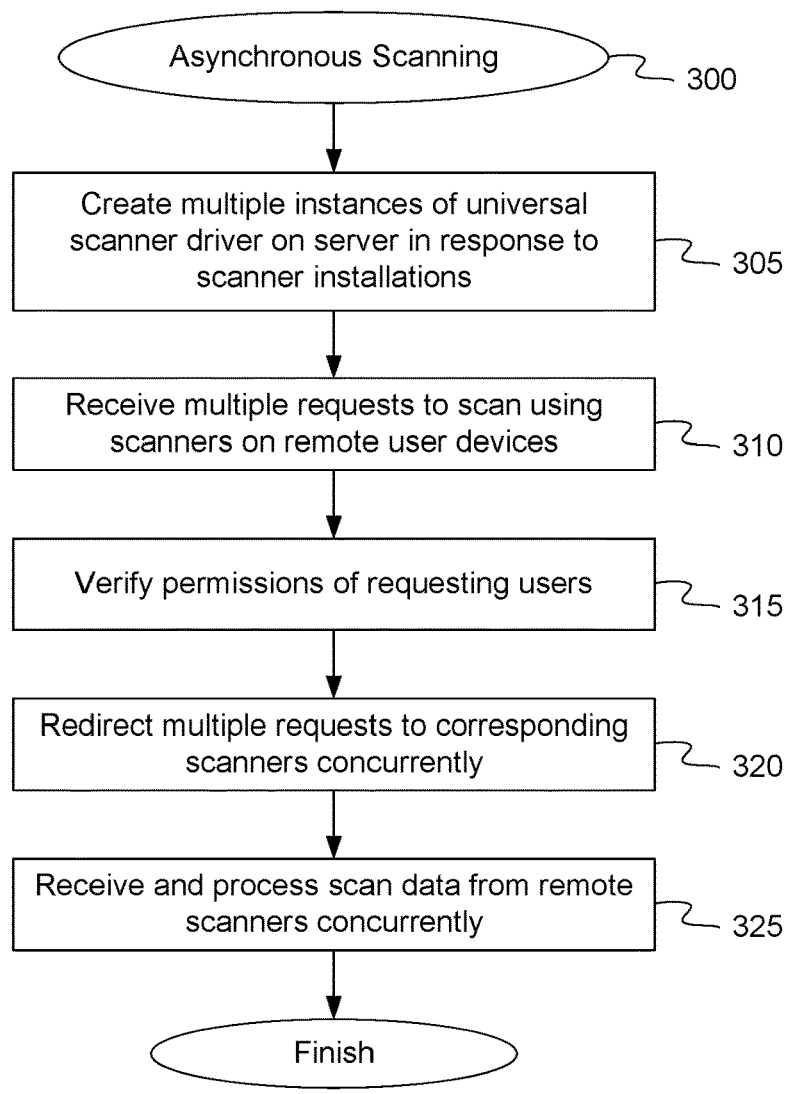
FIG. 3 is a flow diagram illustrating an asynchronous scanning method, according to an embodiment.

FIG. 3 is a flow diagram illustrating an asynchronous scanning method, according to an embodiment. The method 300 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to allow an operating system on a server 140 to utilize a single universal scanner driver to concurrently support multiple users scanning documents with different physical scanners connected to remote user devices. In one embodiment, method 300 may be performed by server 140 and redirect manager 160, as shown in FIGS. 1-2.

Referring to FIG. 3, at block 305, method 300 creates multiple instances 152a, 152b of a universal scanner driver 146 on server 140. In response to requests from users to install multiple scanners connected to their remote user devices for use with server 140, driver instance generator 264 generates each instance 152a, 152b of universal scanner driver 146 and each corresponding unique setup information file (INF file) 154a, 154b. Universal scanner driver 146 may be installed once, and each scanner installation causes the creation of a separate instance 152a, 152b of code (e.g., registry entries, locks, logic) provided by universal scanner driver 146. Thus, there may be one instance of universal scanner driver 146 and one unique setup information file for each scanner utilized with server 140.

At block 310, method 300 receives multiple requests to scan documents using scanners 116 and 126 on remote user devices 110 and 120. In one embodiment, operating system 144 may receive requests from application 142 to scan one or more documents using at least one of scanners 116 and 126. Operating system 144 can notify operating system interface 262 of the received requests.

At block 315, method 300 verifies permissions of the users making the scanning requests. In one embodiment, only the user who requested that a particular scanner be installed is authorized to perform scanning operations using that scanner. Permission manager 268 can access permission entries in operating system registry 145 created at the time of installation to determine whether a particular user is authorized to access a particular scanner.

At block 320, method 300 redirects the multiple scanning requests to corresponding scanners 116 and 126 concurrently. In one embodiment, client redirect interface 266 provides the scanning requests to a scanning process of operating system 144 which calls the instances 152a, 152b of universal scanner driver 146 corresponding to the requested scanners 116 and 126. Each instance 152a, 152b sends the request to redirect client 112 or 122 on user device 110 or 120 for execution by the corresponding scanner-specific driver 114 or 124.

At block 325, method 300 receives and processes scan data from remote scanners 116 and 126 concurrently. In one embodiment, the scanning is performed concurrently because a period of time between sending a first scan request to a first instance 152a of the universal scanner driver 146 and receiving the first scan data from user device 110 overlaps, at least in part, with a period of time between sending the second request to the second instance 152b of the universal scanner driver 146 and receiving the second scan data from user device 120. The scanning operations need not be performed simultaneously to be concurrent, but rather a subsequent scanning operation can begin before a prior scanning operation is fully completed.

Figure 4:
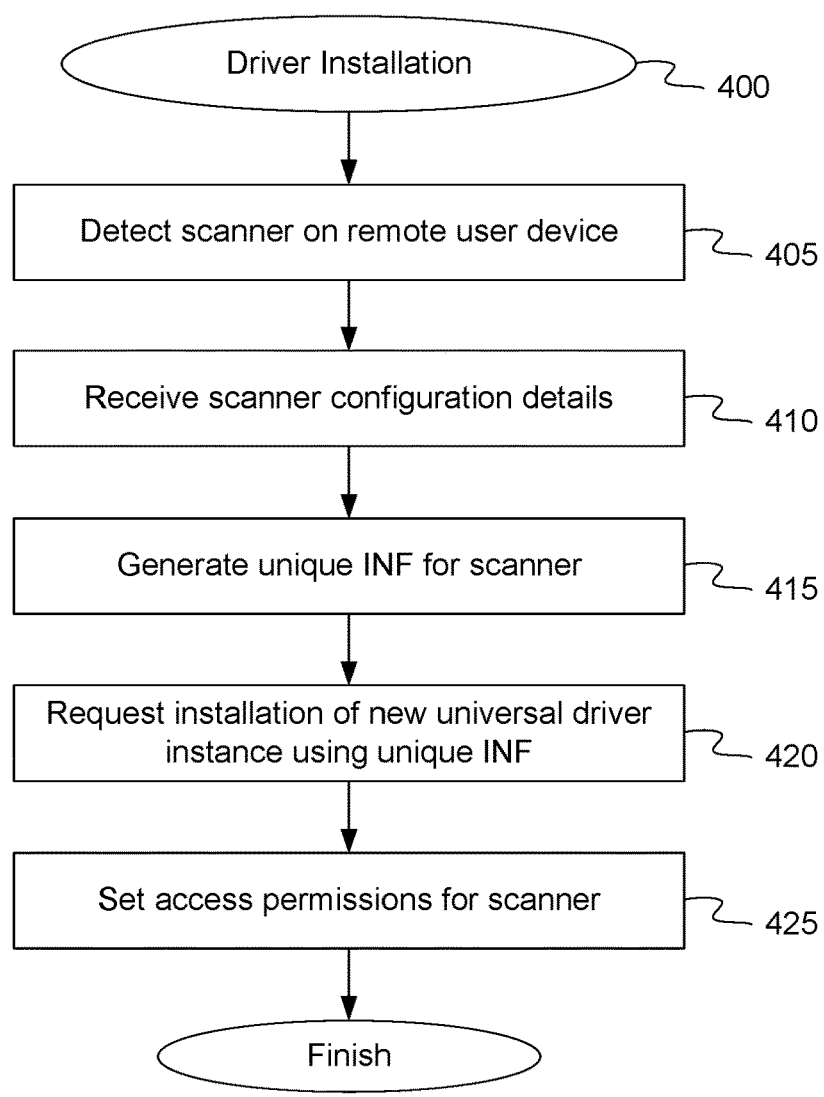
FIG. 4 is a flow diagram illustrating a universal scanner driver installation method, according to an embodiment.

FIG. 4 is a flow diagram illustrating a universal scanner driver installation method, according to an embodiment. The method 400 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to allow an operating system on a server 140 to utilize a single universal scanner driver to concurrently support multiple users scanning documents with different physical scanners connected to remote user devices. In one embodiment, method 400 may be performed by server 140 and redirect manager 160, as shown in FIGS. 1-2.

Referring to FIG. 4, at block 405, method 400 detects a scanner 116 at a network connected user device 110. In one embodiment, operating system interface 262 receives a request from a user of user device 110 and application 142 on server 140 to install scanner 116. In another embodiment, redirect manager 160, in cooperation with redirect client 112, automatically detects the presence of scanner 116 at user device 110 when the user logs on to server 140 or launches application 142. In one embodiment, where there are multiple scanners connected to user device 110, redirect client 112 may provide an interface through which the user may select one or more of the multiple scanners to install.

Redirect manager 160 may then make a request to operating system 144 to install the scanner 116 or scanners (after generating the unique INF).

At block 410, method 400 receives scanner configuration details from the network connected user device 110. In one embodiment, client redirect interface 266 receives scanner configuration details from user device 110 in response to a request. The scanner configuration details may include, for example, supported paper sizes, speeds, resolutions, colors, etc. of corresponding scanner 116.

At block 415, method 400 generates a unique setup information file (INF file) 154a corresponding to scanner 116 based on the scanner configuration details. In one embodiment, driver instance generator 264 creates a copy of general scanner INF file 244 and modifies the copy to reflect the received scanner configuration details. The unique INF file 154a can be used by redirect manager 160 to customize the instance 152a of universal scanner driver 146 for use with scanner 116.

At block 420, method 400 requests installation of an instance 152a of universal scanner driver 146 corresponding to scanner 116 and generated based on the unique setup information file 154a. In one embodiment, operating system interface 262 sends the request to a scanning process of operating system 144, which in turn creates the corresponding instance 152a of universal scanner driver 146.

At block 425, method 400 sets access permissions for scanner 116 in operating system registry 145 on server 140. In one embodiment, the access permissions permit only the user who requested installation of scanner 116 to utilize scanner 116 for scanning purposes. In another embodiment, the user who requested installation of scanner 116 can designate one or more other users or programs who are allowed to access scanner 116. Since each scanner is seen to be a unique device using a different driver, all driver locks in registry 145 are unique to that particular driver instance 152a. In one embodiment, upon installation of a scanner, operating system 144 designates an area of registry 145 for storing entries related to the redirected scanner. Permission manager 268 writes to and reads from this area to set and determine the access permissions. Since there are separate instances 152a, 152b of universal scanner driver 146 for each scanner, the locks are not shared with any other device.

Figure 5:
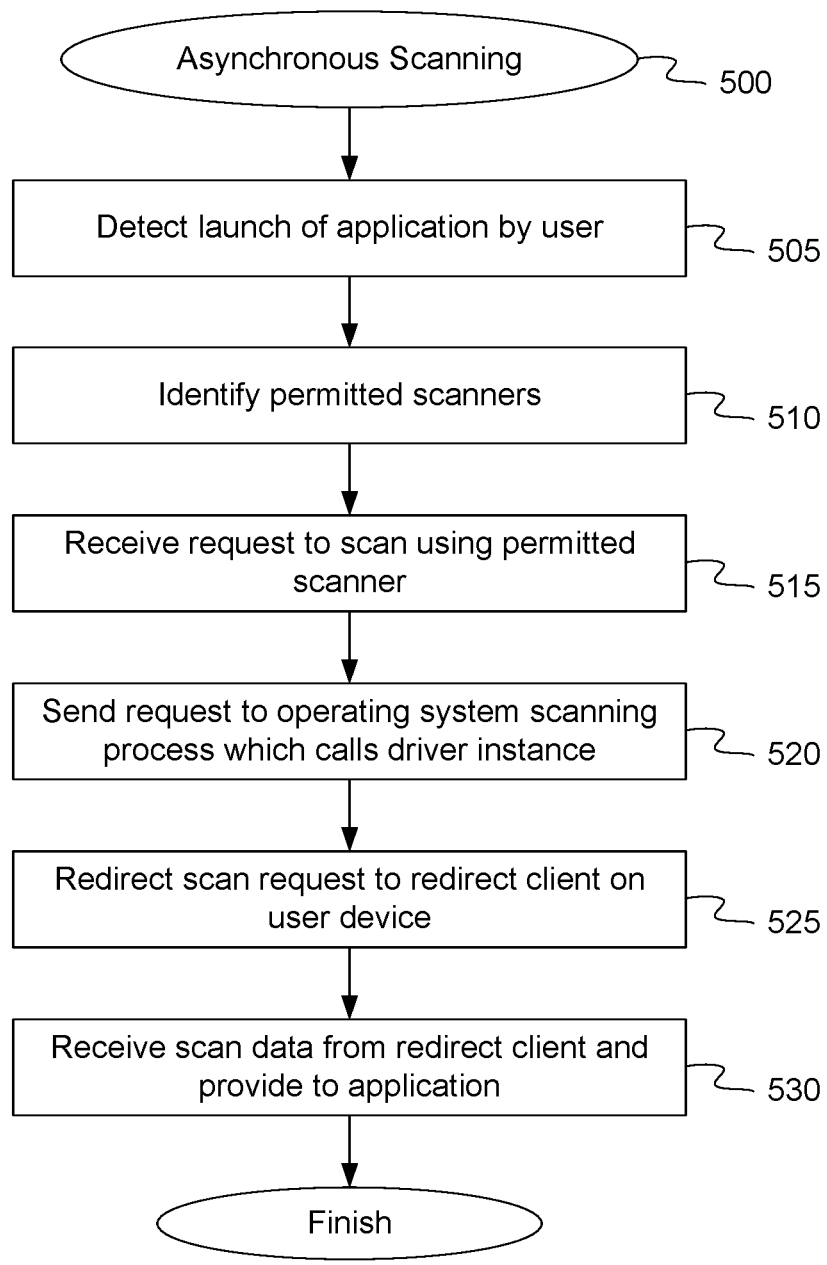
FIG. 5 is a flow diagram illustrating an asynchronous scanning method, according to an embodiment.

FIG. 5 is a flow diagram illustrating an asynchronous scanning method, according to an embodiment. The method 500 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to allow an operating system on a server 140 to utilize a single universal scanner driver to concurrently support multiple users scanning documents with different physical scanners connected to remote user devices. In one embodiment, method 500 may be performed by server 140 and redirect manager 160, as shown in FIGS. 1-2.

Referring to FIG. 5, at block 505, method 500 detects the launch of application 142 by a user. In one embodiment, operating system interface 262 can detect the launch of application 142 by a user. Operating system 144 may notify operating system interface 262 when application 142 is launched.

At block 510, method 500 identifies permitted scanners which the user is authorized to use. In one embodiment, permission manager 268 can read the permission entries in operating system registry 145 to determine whether a particular user is authorized to access a particular scanner. Permission manager 268 can notify application 142 of which scanners the user is authorized to access and can instruct application 142 to provide a list of authorized scanners to the user for selection. Since the permissions are specific to each particular user, when a different user launches application 142, the list of permitted scanners will be specific to that different user and may or may not include scanners which the first user was authorized to access.

At block 515, method 500 receives a request to scan a document using one of the permitted scanners. In one embodiment, operating system 144 may receive a request from application 142 to scan one or more documents using at least one of scanners 116 and 126. Operating system 144 can notify operating system interface 262 of the received request.

At block 520, method 500 sends the request to an operating system scanning process which calls the corresponding instance 152a of universal scanner driver 146. In one embodiment, client redirect interface 266 provides the scanning request to a scanning process of operating system 144 which calls the instance 152a of universal scanner driver 146 corresponding to the requested scanner 116. Thus, in one embodiment, the scan request can be initiated by a user of user device 110 who is accessing application 142 running on server 140.

At block 525, method 500 redirects the scan request to redirect client 112 on user device 110. Driver instance 152a sends the request to redirect client 112 on user device 110 for execution by the corresponding scanner-specific driver 114.

At block 530, method 500 receives scan data from redirect client 112 and provides the scan data to application 142.

Figure 6:
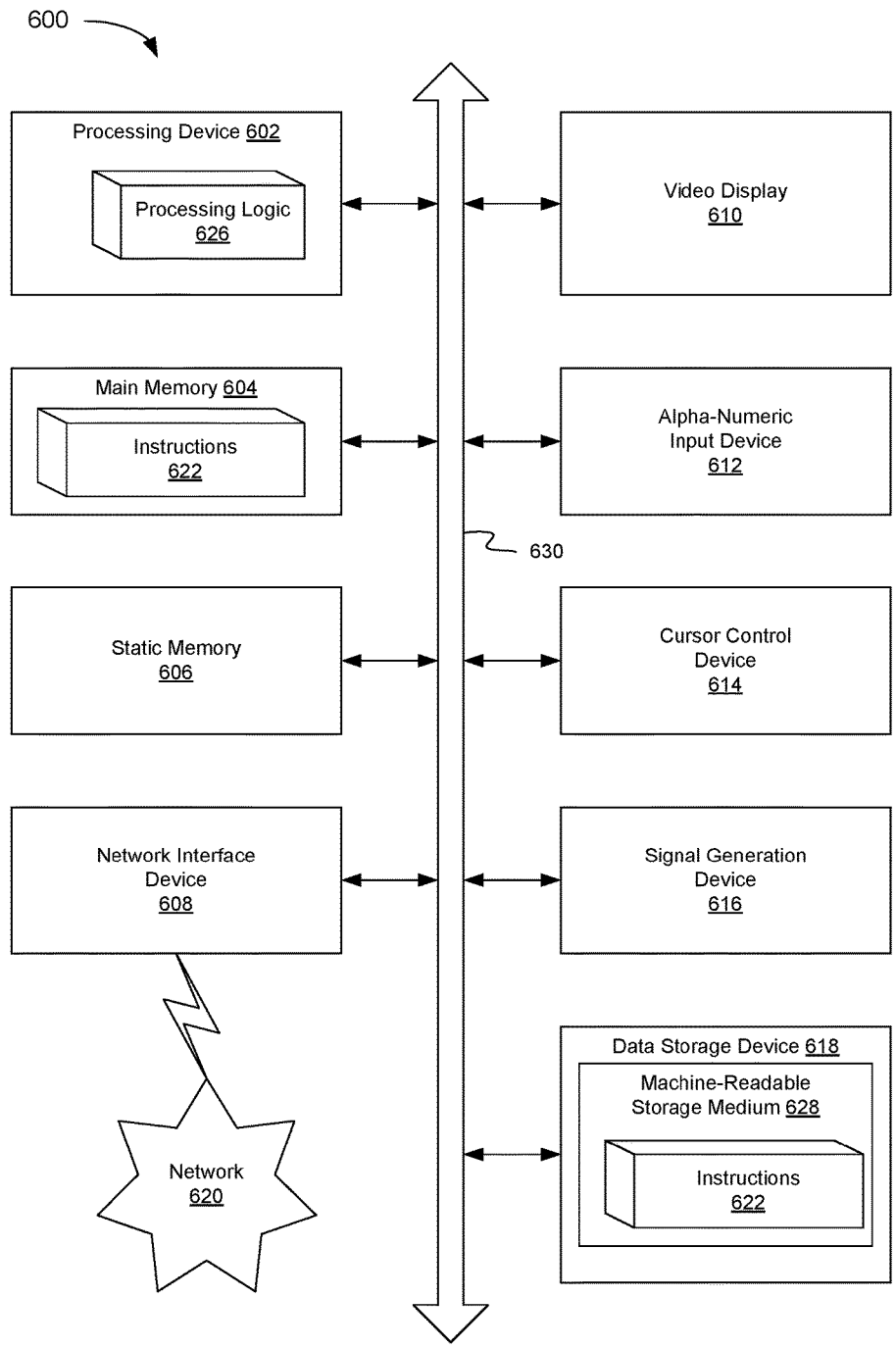
FIG. 6 is a block diagram illustrating an exemplary computer system, according to an embodiment.

FIG. 6 illustrates a diagrammatic representation of a machine in the exemplary form of a computer system 600 within which a set of instructions, for causing the machine to perform any one or more of the methodologies discussed herein, may be executed. For example, the instructions may cause the machine to perform asynchronous scanning using redirected scanners with a single driver. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may represent either user devices 110 and 120 or server 140 of FIGS. 1-2.

The exemplary computer system 600 includes a processing device (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 618, which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein. In one embodiment, processing logic 626 is representative of redirect manager 160.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable medium 628 on which is stored one or more sets of instructions 622 (e.g., instructions of redirect manager 160) embodying any one or more of the methodologies or functions described herein. The instructions 622 may also reside, completely or at least partially, within the main memory 604 and/or within processing logic 626 of the processing device 602 during execution thereof by the computer system 600, the main memory 604 and the processing device 602 also constituting computer-readable media. The instructions may further be transmitted or received over a network 620 via the network interface device 608.

While the computer-readable storage medium 628 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
generating, by a processing device, a first instance of a universal scanner driver on a server and a second instance of the universal scanner driver on the server, wherein the first instance is customized for use with a first scanner at a first user device by a first unique information file associated with the first instance and the second instance is customized for use with a second scanner at a second user device by a second unique information file associated with the second instance, wherein the first scanner and the second scanner are of two different types, wherein the first and second unique information files comprise configuration details for the first and second scanners received from the first and second user devices, and wherein the universal scanner driver is configured to support a plurality of different types of redirected scanners including the two different types of the first scanner and the second scanner;

receiving a first request for an application running on the server to scan a first document using the first scanner and a second request for the application to scan a second document using the second scanner concurrently;

sending, using the first instance of the universal scanner driver, the first request to a first redirect client on the first user device and, using the second instance of the universal scanner driver, the second request to a second redirect client on the second user device concurrently;

receiving first scan data corresponding to the first document from the first redirect client and second scan data corresponding to the second document from the second redirect client; and in response to the first request to scan the first document being completed, destroying, by the server, the first instance of the universal scanner driver that is configured to support the plurality of different types of redirected scanners including the two different types of the first scanner and the second scanner, the first instance being destroyed having been run on the server along with the second instance, wherein the second instance continues to run on the server after the first instance is destroyed.

2. The method of claim 1, further comprising:
receiving scanner configuration details from the first and second user devices; and
generating the first and second unique setup information files based on the scanner configuration details.

3. The method of claim 2, wherein the first and second instances of the universal scanner driver are generated using the first and second unique setup information files, respectively.

4. The method of claim 2, wherein the first and second unique setup information files comprise INF files.

5. The method of claim 1, further comprising:
determining that a first user making the first request is authorized to access the first scanner; and
determining that a second user making the second request is authorized to access the second scanner.

6. The method of claim 1, wherein determining that the first and second users are authorized comprises accessing permission entries in an operating system registry on the server, the permission entries corresponding to the first and second scanners.

7. The method of claim 1, further comprising:
providing the first request and the second request to an operating system scanning process on the server, the operating system scanning process to call the first instance and the second instance of the universal scanner driver.

8. The method of claim 1, wherein a period of time between sending the first request to the first redirect client and receiving the first scan data overlaps, at least in part, with a period of time between sending the second request to the second redirect client and receiving the second scan data.

9. A server computer system comprising:
a memory; and
a processing device operatively coupled to the memory, the processing device to:
receive a first request to scan a first document using a first scanner at a first user device connected to the server computer system over a network;
send the first scan request to a first instance of a universal scanner driver on the server computer system, wherein the first instance of the universal scanner driver is customized for use with the first scanner by a first unique information file associated with the first instance, the first instance of the universal scanner driver to redirect the first scan request to a first redirect client on the first user device;
receive a second request to scan a second document using a second scanner at a second user device connected to the server computer system over the network;
send the second scan request to a second instance of the universal scanner driver on the server computer system, wherein the second instance of the universal scanner driver is customized for use with the second scanner by a second unique information file associated with the second instance, the second instance of the universal scanner driver to redirect the second scan request to a second redirect client on the second user device, wherein the first and second scan requests are processed concurrently on the server computer system, wherein the first scanner and the second scanner are of two different types, wherein the first and second unique information files comprise configuration details for the first and second scanners received from the first and second user devices, and wherein the universal scanner driver is configured to support a plurality of different types of redirected scanners including the two different types of the first scanner and the second scanner; and
in response to the first request to scan the first document being completed, destroy, by the server, the first instance of the universal scanner driver that is configured to support the plurality of different types of redirected scanners including the two different types of the first scanner and the second scanner, the first instance being destroyed having been run on the server along with the second instance, wherein the second instance continues to run on the server after the first instance is destroyed.

10. The server computer system of claim 9, wherein the processing device further to:
detect a launching of an application on the server computer system; and
determine a plurality of scanners permitted to be accessed by the application.

11. The server computer system of claim 10, wherein to determine the plurality of scanners permitted to be accessed by the application, the processing device to read permission entries in an operating system registry on the server computer system.

12. The server computer system of claim 10, wherein the processing device further to:
determine whether a first user making the first request is authorized to access the first scanner; and
determine whether a second user making the second request is authorized to access the second scanner.

13. The server computer system of claim 9, wherein the processing device further to:
provide the first request and the second request to an operating system scanning process on the server computer system, the operating system scanning process to call the first instance and the second instance of the universal scanner driver.

14. The server computer system of claim 9, wherein the processing device further to:
receive first scan data corresponding to the first document from the first redirect client; and
receive second scan data corresponding to the second document from the second redirect client.

15. The server computer system of claim 14, wherein a period of time between sending the first scan request to the first instance of the universal scanner driver and receiving the first scan data overlaps, at least in part, with a period of time between sending the second request to the second instance of the universal scanner driver and receiving the second scan data.

16. A non-transitory computer readable storage medium storing instructions that, when executed by a processing device, cause the processing device to:
detect a first scanner at a first network connected user device, wherein the first scanner and a second scanner are of two different types;
receive, at a server, scanner configuration details from the first network connected user device;
generate, by the processing device, a unique setup information file corresponding to the first scanner based on the scanner configuration details;
request installation of a first instance of a universal scanner driver on the server, wherein the first instance of the universal scanner driver is customized for use with the first scanner by the unique setup information file, wherein the unique information file comprises configuration details for the first scanner received from the first network connected user device, and wherein the first instance of the universal scanner driver to redirect scan requests for the first scanner to the first network connect user device and receive scan data corresponding to documents scanned by the first scanner, wherein the universal scanner driver is configured to support a plurality of different types of redirected scanners including the two different types of the first scanner and the second scanner; and
in response to the first scanner being disconnected from the first network connected user device, request removal, from the server, of first instance of the universal scanner driver that is configured to support the plurality of different types of redirected scanners including the two different types of the first scanner and the second scanner, the first instance being removed having been run on the server along with a second instance of the universal scanner driver, wherein the second instance continues to run on the server after the first instance is removed.

17. The non-transitory computer readable storage medium of claim 16, wherein to detect the first scanner, the instructions cause the processing device to receive a request from a user to install the first scanner as a virtual device on the server.

18. The non-transitory computer readable storage medium of claim 16, wherein the unique setup information file comprises an INF file.

19. The non-transitory computer readable storage medium of claim 16, wherein the instructions further cause the processing device to:
assign the first instance of the universal scanner driver a unique name and a unique identifier to be used in communications between the server and the first network connected user device.

20. The non-transitory computer readable storage medium of claim 16, wherein the instructions further cause the processing device to:
set access permissions for the scanner in an operating system registry on the server.

* * * * *